(12) United States Patent
Kitajima et al.

(10) Patent No.: US 9,185,358 B2
(45) Date of Patent: Nov. 10, 2015

(54) IMAGING APPARATUS

(75) Inventors: Tatsutoshi Kitajima, Tokyo (JP); Shigeru Oouchida, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 274 days.

(21) Appl. No.: 13/824,760

(22) PCT Filed: Sep. 27, 2011

(86) PCT No.: PCT/JP2011/072710
§ 371 (c)(1),
(2), (4) Date: Mar. 18, 2013

(87) PCT Pub. No.: WO2012/043847
PCT Pub. Date: Apr. 5, 2012

(65) Prior Publication Data
US 2013/0182102 A1     Jul. 18, 2013

(30) Foreign Application Priority Data
Sep. 28, 2010   (JP) .................................. 2010-216601

(51) Int. Cl.
*H04N 7/18*     (2006.01)
*G01N 21/25*    (2006.01)
(Continued)

(52) U.S. Cl.
CPC .................. *H04N 7/18* (2013.01); *G01C 3/085* (2013.01); *G01S 11/12* (2013.01); *G02B 7/30* (2013.01); *G03B 7/26* (2013.01); *G03B 13/20* (2013.01); *G03B 13/36* (2013.01); *H04N 5/23241* (2013.01)

(58) Field of Classification Search
CPC .......... G01C 3/085; G01S 11/12; G02B 7/30; H04N 7/18
USPC ......................................................... 348/139
See application file for complete search history.

(56) References Cited

U.S. PATENT DOCUMENTS

| 5,943,514 A | 8/1999 | Sato et al. |
| 6,243,537 B1 | 6/2001 | Higashino |

(Continued)

FOREIGN PATENT DOCUMENTS

| CN | 201059970 Y | 5/2008 |
| EP | 2 161 603 A1 | 3/2010 |

(Continued)

OTHER PUBLICATIONS

International Search Report Issued Jan. 10, 2012 in PCT/JP2011/072710 Filed Sep. 27, 2011.

(Continued)

*Primary Examiner* — Hee-Yong Kim
(74) *Attorney, Agent, or Firm* — Oblon, McClelland, Maier & Neustadt, L.L.P.

(57) ABSTRACT

An imaging apparatus includes: an imaging optical system that obtains an optical image of a photographic subject; a plurality of image sensor elements that output image data based on the optical image of the photographic subject obtained by the imaging optical system; an electric power supply controller that controls electric power supply to the plurality of image sensor elements; and a distance metering device that includes the plurality of image sensor elements and the electric power supply controller, and measures a distance to the photographic subject based on an output of the image sensor elements, wherein the plurality of image sensor elements are aligned in line and formed on one semiconductor wafer, and the electric power supply controller performs electric power supply to the plurality of image sensor elements in accordance with operating conditions set to the imaging apparatus.

11 Claims, 14 Drawing Sheets

(51) Int. Cl.
*G01C 3/08* (2006.01)
*G01S 11/12* (2006.01)
*G02B 7/30* (2006.01)
*G03B 7/26* (2006.01)
*G03B 13/20* (2006.01)
*G03B 13/36* (2006.01)
*H04N 5/232* (2006.01)

(56) References Cited

U.S. PATENT DOCUMENTS

| | | | |
|---|---|---|---|
| 8,369,700 | B2 | 2/2013 | Oouchida |
| 2001/0038453 | A1* | 11/2001 | Jung et al. .................... 356/419 |
| 2003/0103769 | A1 | 6/2003 | Ohkado |
| 2003/0142969 | A1* | 7/2003 | Tsunemiya et al. .......... 396/121 |
| 2011/0188843 | A1 | 8/2011 | Oouchida |

FOREIGN PATENT DOCUMENTS

| | | |
|---|---|---|
| JP | 62-182703 A | 8/1987 |
| JP | 10-39203 | 2/1998 |
| JP | 2001-264622 | 9/2001 |
| JP | 2004-325592 | 11/2004 |
| JP | 2007-322128 | 12/2007 |
| JP | 2008-233205 | 10/2008 |
| JP | 2008-306254 | 12/2008 |

OTHER PUBLICATIONS

Office Action issued Oct. 1, 2014 in Japanese Patent Application No. 2010-216601.
Chinese Office Action issued Oct. 31, 2014, in China Patent Application No. 201180057091.7 (with English translation).
Extended European Search Report issued Sep. 4, 2014 in Patent Application No. 11829400.8.

* cited by examiner

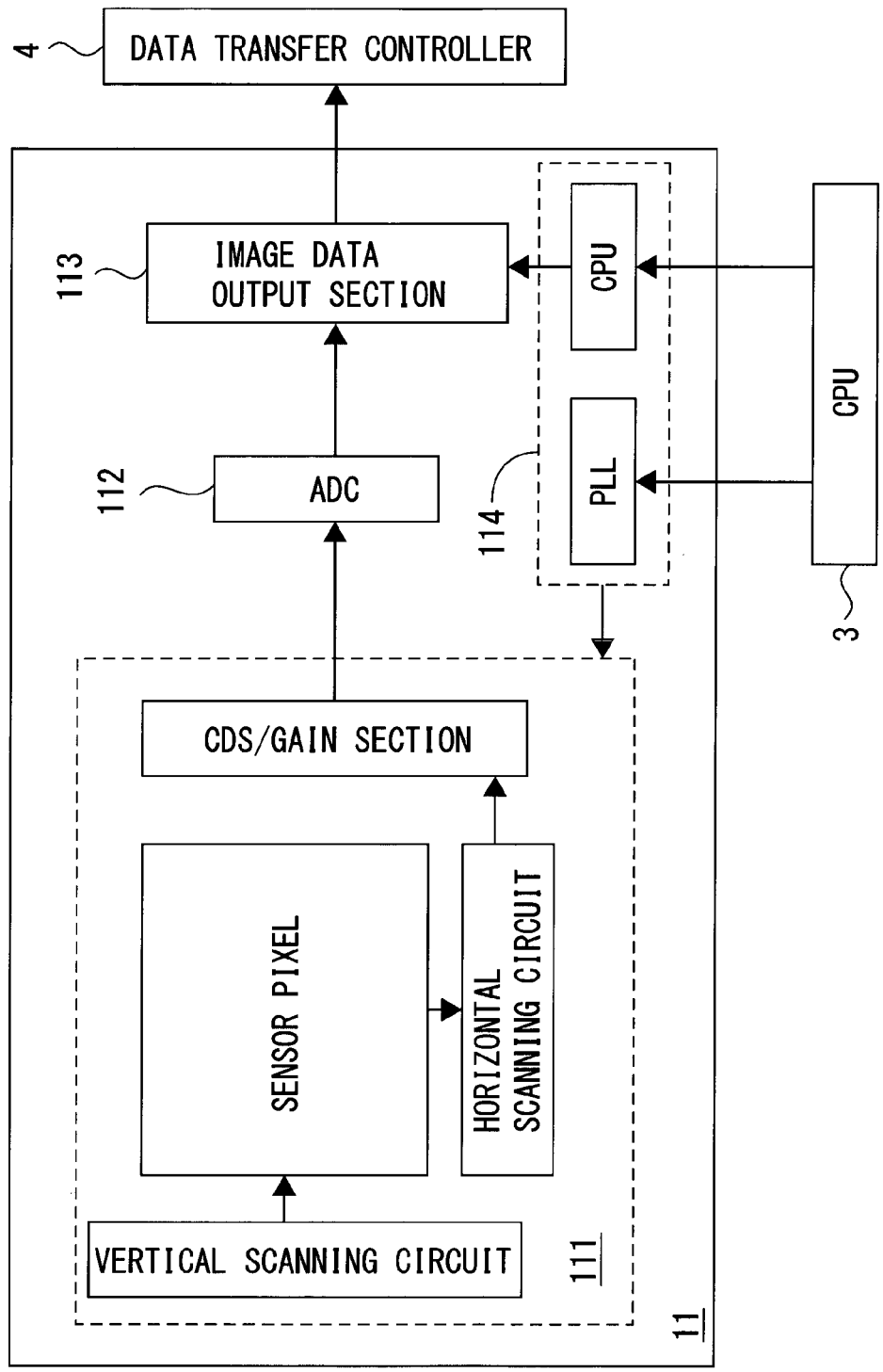

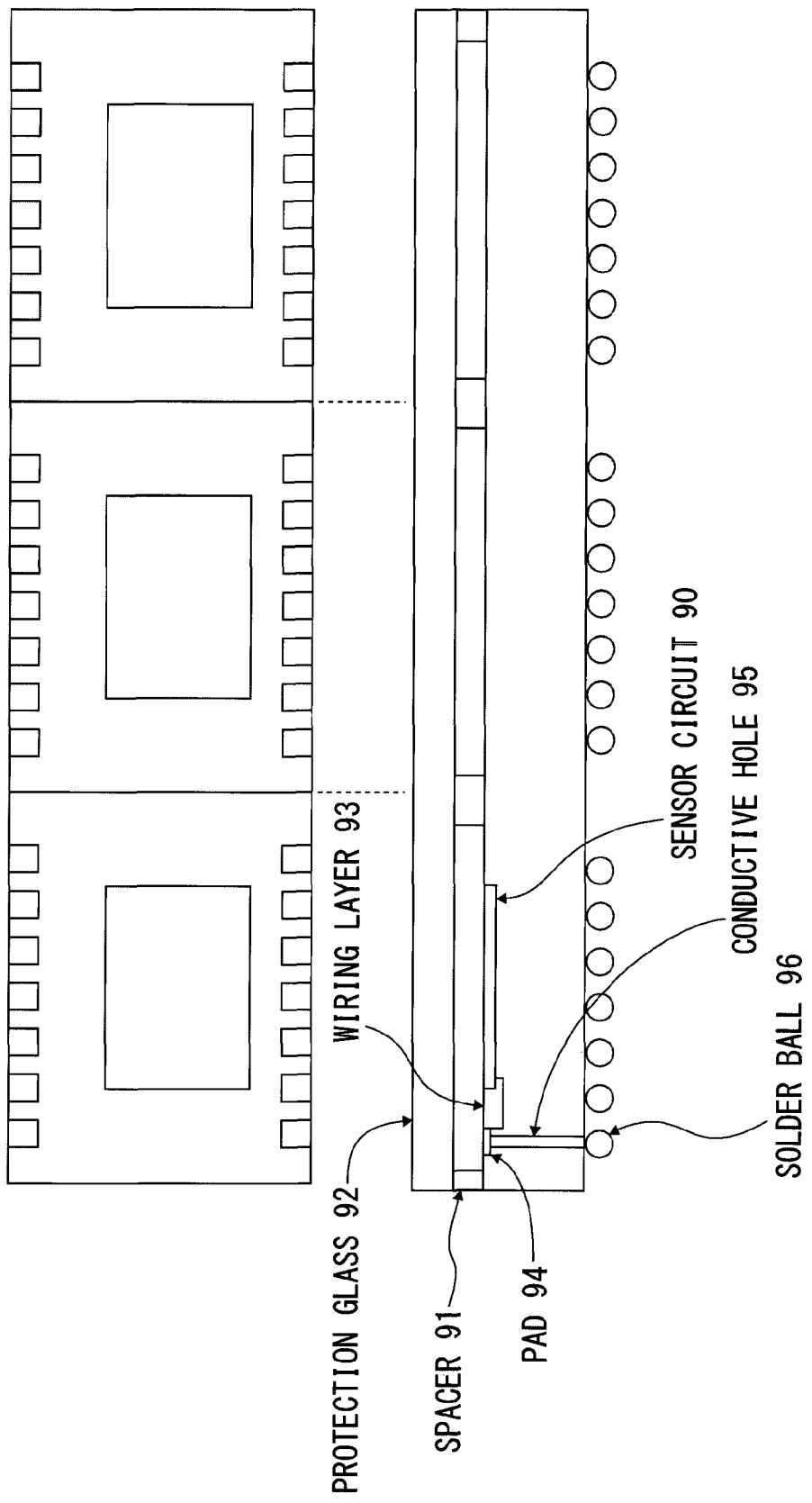

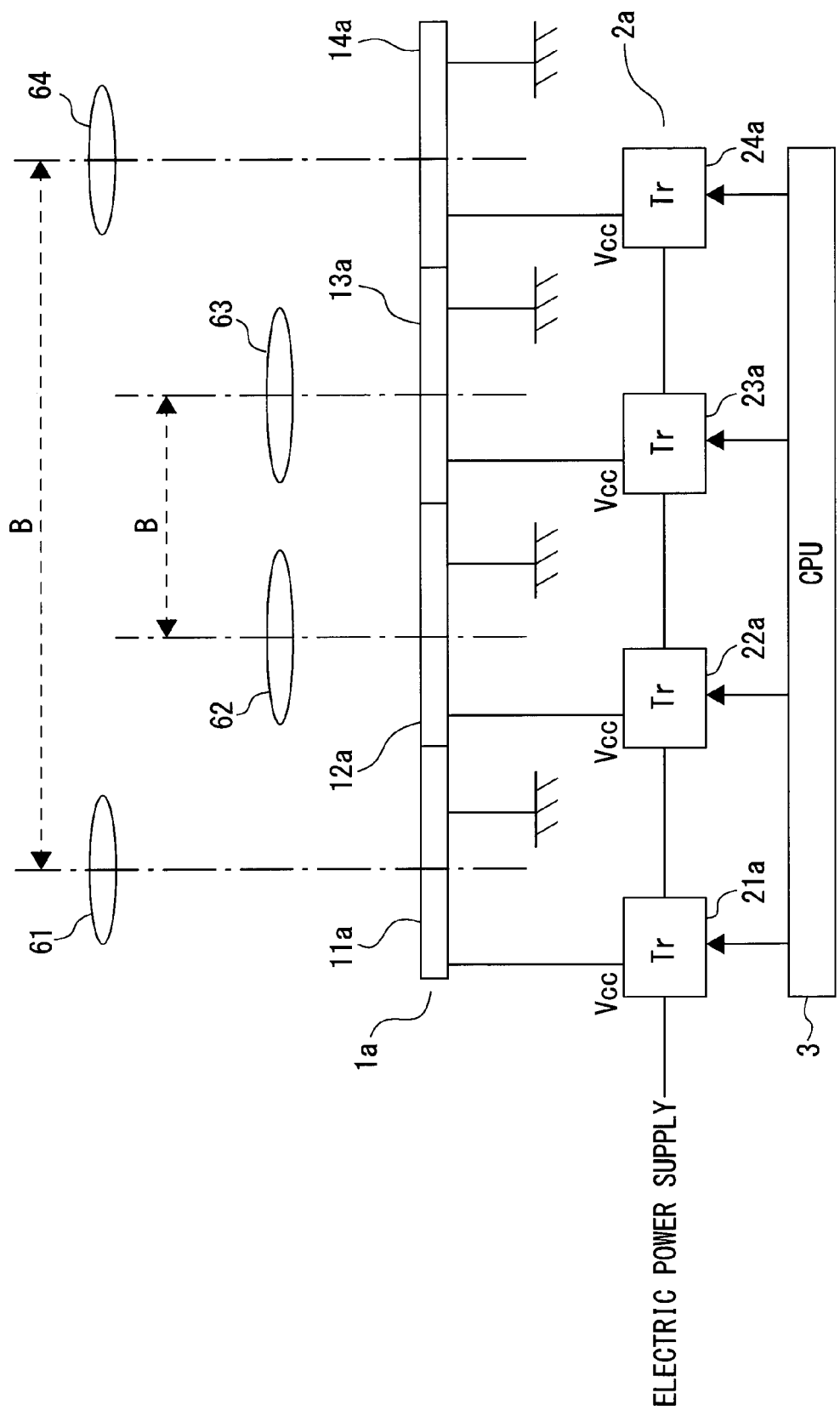

AREA A

AREA B

FIG.14

| 0 | $-\dfrac{1}{4}$ | 0 |
|---|---|---|
| $-\dfrac{1}{4}$ | 1 | $-\dfrac{1}{4}$ |
| 0 | $-\dfrac{1}{4}$ | 0 |

× α

(HPF CHARACTERISTIC)

IMAGING APPARATUS

TECHNICAL FIELD

The present invention relates to an imaging apparatus having a distance metering device that measures a distance to a photographic subject.

BACKGROUND ART

An imaging apparatus having an auto-focus (AF) function has a distance metering device that measures a distance to a photographic subject. A plurality of distance measurement methods used for the distance metering device are known. For example, triangulation is known as a distance measurement method (see Japanese patent number 3761383). A distance metering device disclosed in Japanese patent number 3761383 (in Japanese patent number 3761383, it is described as an external AF sensor) has a pair of lenses for distance measurement that are arranged at a predetermined interval, and image sensors for distance measurement that are arranged corresponding to each of the lenses for distance measurement. Each of the image sensors for distance measurement has a light-receiving surface, and forms an image of a photographic subject on the light-receiving surface through each of the lenses for distance measurement. Based on the image of the photographic subject formed on each light-receiving surface, a pixel signal is outputted from each of the image sensors for distance measurement. Parallax is calculated by use of those two pixel signals, and based on the parallax, the distance to the photographic subject is calculated.

As for the distance metering device using triangulation as in the above, it is necessary for light-receiving surfaces of two image sensors for distance measurement to be precisely arranged on the same flat surface. That is, each light-receiving surface of each of the image sensors for distance measurement is not supposed to have an angle shift. And additionally, it is necessary for each light-receiving surface of each of the image sensors for distance measurement to be precisely arranged at a position that is a predetermined distance (length of baseline) away from each other. Therefore, in a conventional distance metering device to which triangulation is applied, precise arrangement of the image sensors for distance arrangement on a circuit board in a production process is required, and an adjustment operation for a position shift and an angle shift becomes troublesome. Accordingly, productivity of such a distance metering device is poor.

Therefore, it is known that in a distance metering device in which an adjustment operation in the production process does not become troublesome, each light-receiving surface of the image sensors for distance measurement is arranged on the same flat surface, and positioned at a predetermined distance away from each other, and further a parallax calculation circuit that is arranged on the same semiconductor on which the image sensors for distance measurement are arranged is included (see Japanese patent application publication number 2007-322128).

SUMMARY OF THE INVENTION

However, the distance metering device disclosed in Japanese patent application publication number 2007-322128 has only image sensors for distance measurement such that a length of a baseline is constant, and an output of the image sensors is fixedly inputted in the parallax calculation circuit.

An object of the present invention is to provide an imaging apparatus with a distance metering device, the distance metering device including: an image sensor array that is formed by a plurality of image sensor elements including a plurality of image sensor elements for distance measurement formed at predetermined intervals on a general-purpose semiconductor wafer and which is cut out; and a parallax calculator that calculates parallax based on output data of the image sensor elements for distance measurement, and in which at least one image sensor element for distance measurement is capable of being used for different usage from parallax calculation.

In order to achieve the above object, the embodiment of the present invention provides: an imaging apparatus comprising: an imaging optical system that obtains an optical image of a photographic subject; a plurality of image sensor elements that output image data based on the optical image of the photographic subject obtained by the imaging optical system; an electric power supply controller that controls electric power supply to the plurality of image sensor elements; and a distance metering device that includes the plurality of image sensor elements and the electric power supply controller, and measures a distance to the photographic subject based on an output of the image sensor elements, wherein the plurality of image sensor elements are aligned in line and formed on one semiconductor wafer, and the electric power supply controller performs electric power supply to the plurality of image sensor elements in accordance with operating conditions set to the imaging apparatus.

BRIEF DESCRIPTION OF DRAWINGS

FIG. 5 is a block diagram of an image sensor element for distance measurement included in the imaging apparatus according to the embodiment of the present invention.

FIG. 9 illustrates a plan view and a cross-sectional view of the image sensor element for distance measurement used in the imaging apparatus according to the embodiment of the present invention.

FIG. 12 is a schematic structure diagram of another distance metering device included in the imaging apparatus according to the embodiment of the present invention.

FIG. 14 is a diagram that illustrates an example of a digital filter in an image processing of the imaging apparatus according to the embodiment of the present invention.

DESCRIPTION OF EMBODIMENTS

Hereinafter, an imaging apparatus according to an embodiment of the present invention will be explained.

Figure 1:
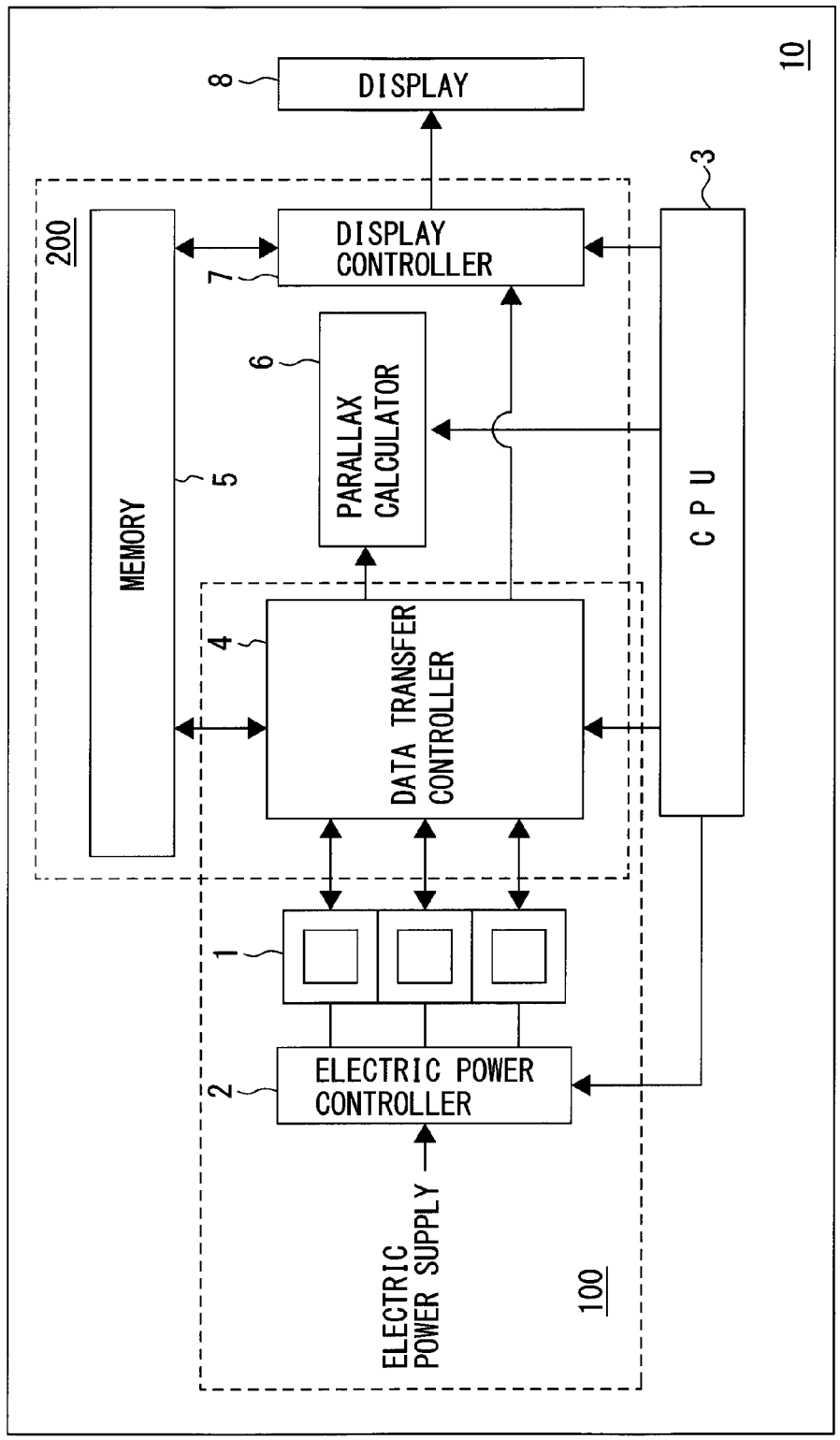
FIG. 1 is a block diagram of an imaging apparatus according to an embodiment of the present invention.

FIG. 1 is a block diagram that illustrates an example of an imaging apparatus according to the embodiment of the present invention. In FIG. 1, an imaging apparatus 10 has an image sensor 1, an electrical power controller 2, a CPU 3, a data transfer controller 4, a memory 5, a parallax calculator 6, a display controller 7, and a display 8.

The image sensor 1 is an image sensor array including equal to or more than three image sensor elements that are aligned in line integrally cut out from a plurality of image sensor elements formed on a semiconductor wafer and are image sensor elements for distance measurement. The image sensor 1, for example, has an image signal output section that includes a light-receiving surface formed by a CMOS sensor, an image data output section that performs an image processing on an image signal outputted from the image signal output section and outputs image data, and an operation controller that sets operating parameters of image processing. FIG. 1 illustrates an example of the image sensor 1 that includes the three aligned image sensor elements integrally cut out. A detailed explanation of the image sensor 1 will be explained later.

The image sensor 1 outputs image data based on an image of a photographic subject formed on a light-receiving surface via lenses for distance measurement (not illustrated). Each of the lenses for distance measurement is a lens that forms an image of a photographic subject on each light-receiving surface, and is arranged corresponding to each image sensor element included in the image sensor 1. The image data outputted from the image sensor 1 is used for parallax calculation in the parallax calculator 6, which is described later. In order to calculate parallax, two image data are needed. Therefore, image data outputted from two image sensor elements that are arranged in both ends of the equal to or more than three image sensor elements aligned in line of the image sensor 1 can be used. In the image sensor 1, the two image sensor elements in both ends are arranged at an interval equivalent to a length of a baseline.

The electric power controller 2 includes a switching circuit that supplies electric power to the image sensor 1 by an instruction from the CPU 3. And the electric power controller 2 is an electric power supply controller that controls electric power supply to the image sensor 1 as an image sensor for distance measurement by an operation of the switching circuit. The electric power controller 2 performs electric power supply control so as to supply electric power to image sensor elements (image sensor elements arranged in both ends of the image sensor 1) that output image data used for the parallax calculation, and so as not to supply electric power to an image sensor element (image sensor element arranged in the center of the image sensor 1) other than the above, for example. And in a case where an operating section (not illustrated) included in the imaging apparatus 10 is operated by a user, and an operation mode (operating condition) of the imaging apparatus is changed, the electric power supply control is performed so as to supply electric power to the image sensor element arranged in the center of the image sensor 1, in accordance with the operation mode after the change. Thus, the electric power supply controller 2 controls electric power supply necessary for the operation of the image sensor 1 that is included in a distance metering device, and therefore it is possible to reduce wasted power consumption.

The CPU 3 performs operation control of the imaging apparatus 10. Operations of the electric power controller 2, the data transfer controller 4, the parallax calculator 6, and the display controller 7 are controlled by the CPU 3.

The data transfer controller 4 outputs the image data outputted from the image sensor 1 to the memory 5, and temporarily stores the image data in the memory 5. And then, the data transfer controller 4 outputs the image data stored in the memory 5 to the parallax calculator 6. And the data transfer controller 4 outputs image data that is not used for the parallax calculation of the image data outputted from the image sensor 1 to the display controller 7. That is, the data transfer controller 4 controls the transfer of the image data outputted from the image sensor 1 to an appropriate block.

The memory 5 operates as a work area in a case where the parallax calculator 6 performs the parallax calculation by use of the image data outputted from the image sensor 1. And additionally, the memory 5 operates as a work area in a case where the display controller 7 converts image data to be displayed on the display 8 of the image data outputted from the image sensor 1 to image data in a displayable format. And furthermore, the memory 5 also operates as a buffer memory on which the image data converted in the displayable format is sequentially stored. The display controller 7 sequentially reads the image data stored in the memory 5 and outputs it to the display 8. For example, a DRAM constitutes the memory 5.

The parallax calculator 6 is a calculator that calculates a distance to a photographic subject by use of the image data outputted from the image sensor 1. The imaging apparatus 10 moves a lens included in an imaging optical system (not illustrated) in accordance with the distance to the photographic subject calculated by the parallax calculator 6 by a driver (not illustrated).

The display controller 7 performs an image processing for converting to displayable data on the display 8 on the image data outputted from the image sensor 1. And the display controller 7 controls the converted image data to be displayed on the display 8 as an image by which a user can confirm a photographic subject (so-called through-the-lens image). A data format converted by the display controller 7 is YUV data, for example. That is, the display controller 7 performs control so as to convert the image data outputted from the image sensor 1 to YUV data and store the YUV data in the memory 5, read the YUV data from the memory 5 at a predetermined time interval, and output the YUV data to the display 8.

On the display 8, for example, in a case where the imaging apparatus 10 is set to perform a monitoring operation, an image of a photographic subject obtained by an imaging optical system is displayed. The monitoring operation is an operation by which the image of the photographic subject obtained by the imaging optical system is sequentially displayed when the imaging apparatus 10 operates. The display 8 is a liquid crystal display monitor that is arranged on a rear side of the imaging apparatus 10, for example. The image data used for displaying on the display 8 is image data outputted from the image sensor element in the center of the image sensor 1. An image displayed on the display 8 when the monitoring operation is performed is called a through-the-lens image.

In a case of displaying the through-the-lens image on the display 8, it is possible to obtain image data by use of an image sensor other than a main image sensor. Here, the main image sensor is an image sensor that is different from the image sensor included in the distance metering device, and that is mainly used for imaging an image of a photographic subject and recording it. Generally, the main image sensor has a large number of pixels, in order to obtain a favorable image. Accordingly, generally, electric power consumption of the main image sensor is larger compared to the image sensor included in the distance metering device having a smaller number of pixels than those of the main image sensor. Therefore, the imaging apparatus 10 displays the through-the-lens image by use of the image sensor included in the distance metering device. While displaying the through-the-lens image, operation of the main image sensor can be stopped. This makes it possible to reduce electric power consumption, and extend the life of an operational electric power supply of the imaging apparatus 10.

Figure 2:
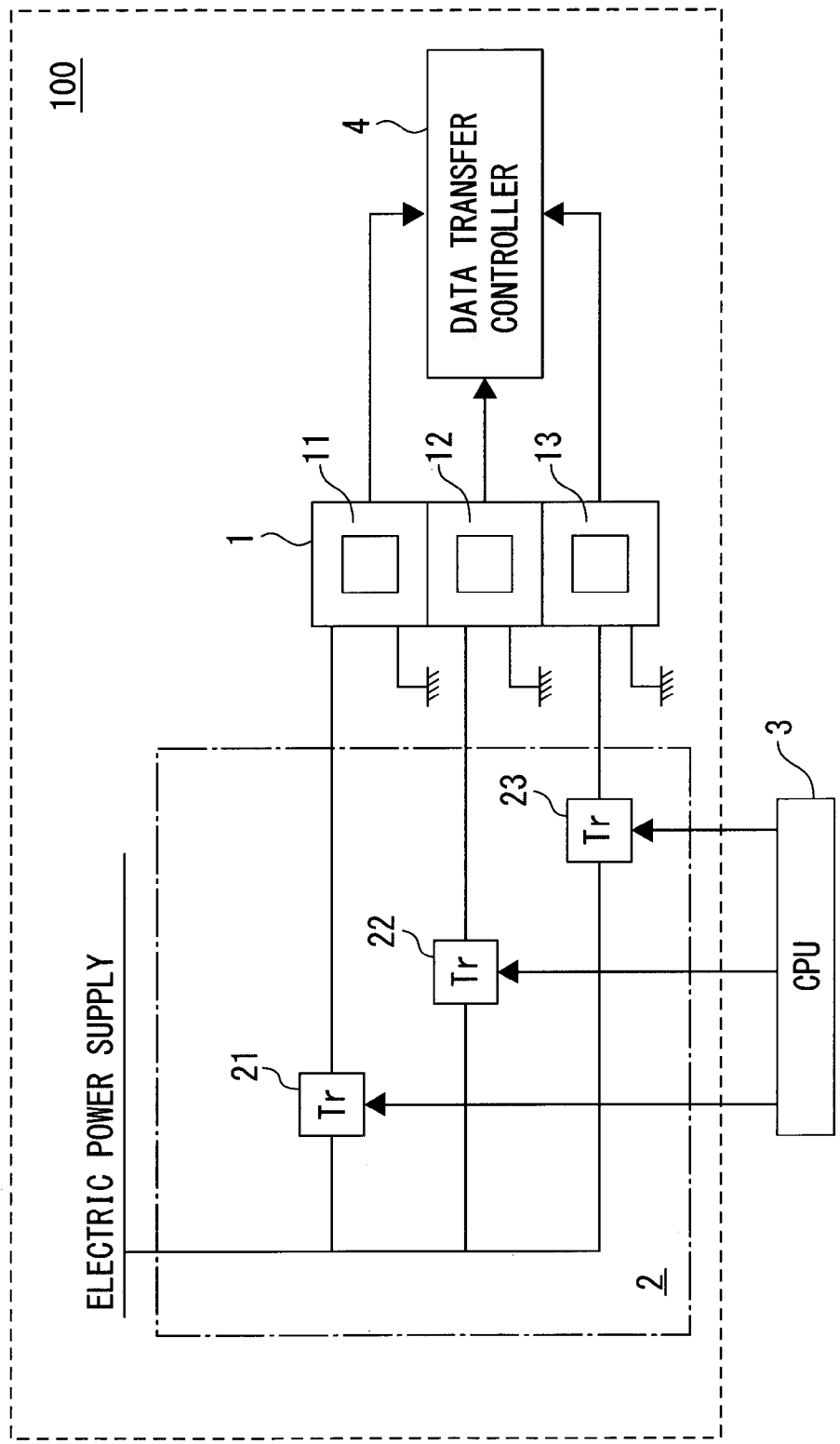
FIG. 2 is a part of an enlarged view of the block diagram of the imaging apparatus according to the embodiment of the present invention.
Figure 3:
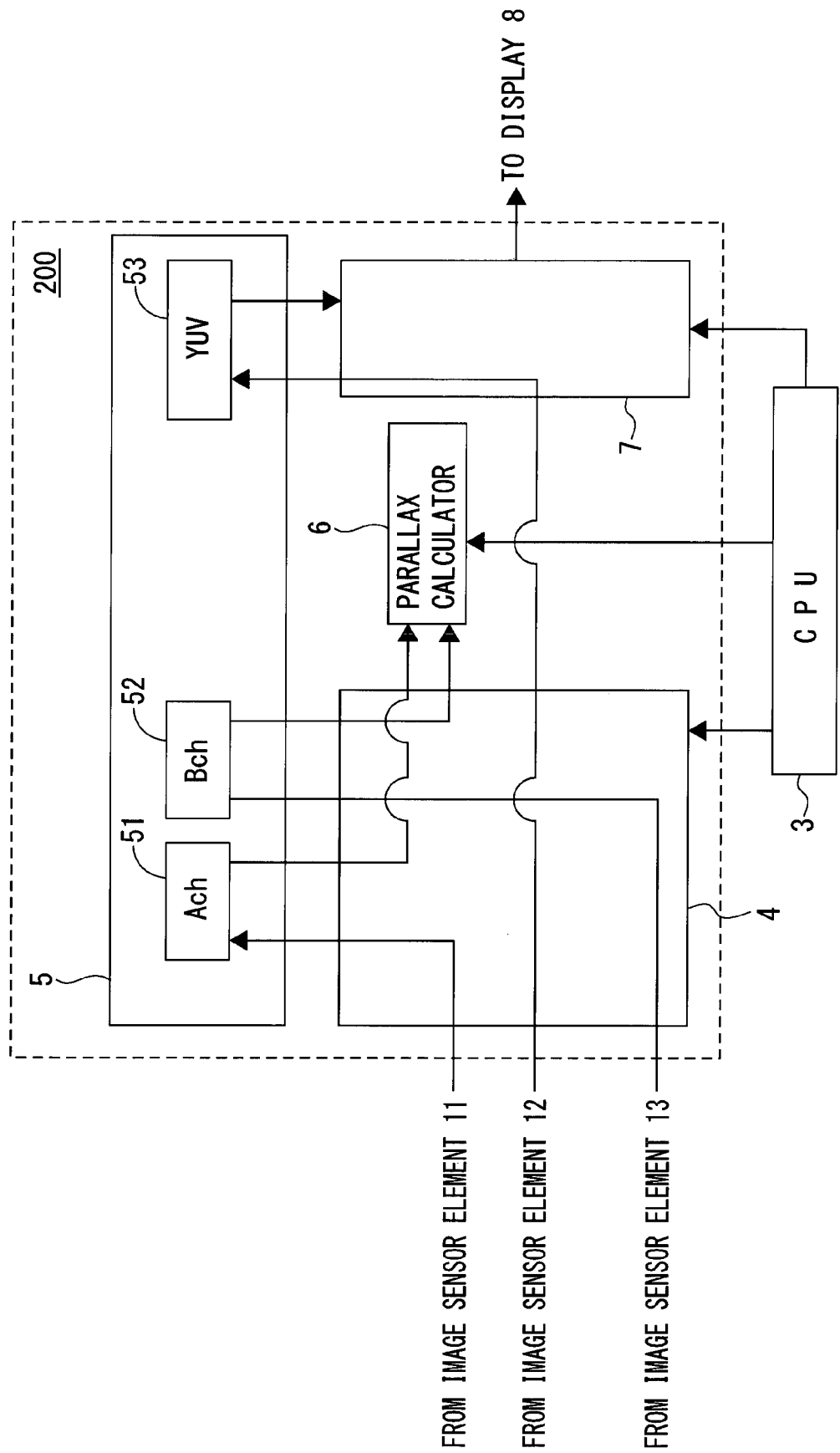
FIG. 3 is a part of an enlarged view of the block diagram of the imaging apparatus according to the embodiment of the present invention.

Next, a more detailed constitution of the imaging apparatus 10 will be explained with reference to FIGS. 2 and 3. FIG. 2 is an enlarged block diagram of a part 100 (see FIG. 1) and the CPU 3 in the imaging apparatus 10. The part 100 includes the image sensor 1, the electric power controller 2, and the data transfer controller 4. FIG. 3 is an enlarged block diagram of a part 200 (see FIG. 1) and the CPU 3 in the imaging apparatus 10. The part 200 includes the data transfer controller 4, the memory 5, the parallax calculator 6, and the display controller 7.

As illustrated in FIG. 2, the image sensor 1 has three image sensor elements 11, 12, and 13. The image sensor elements 11, 12, and 13, which are aligned in line, are integrally cut out from a plurality of image sensor elements formed on the same semiconductor wafer.

The electric power controller 2 is controlled by the CPU 3, and has transistors Tr 21, 22, and 23 that control an operating power supply to the image sensor elements 11, 12, and 13 that constitute the image sensor 1. For example, the transistor Tr 21 controls the operating power supply to the image sensor element 11 arranged in a first end of the image sensor 1. The transistor Tr 22 controls the operating power supply to the image sensor element 12 arranged in the center of the image sensor 1. The transistor Tr 23 controls the operating power supply to the image sensor element 13 arranged in a second end of the image sensor 1.

In a case where a user operates an operating section (not illustrated) of the imaging apparatus 10, and changes an operating condition of the imaging apparatus 10, the CPU 3 controls the transistors Tr 21 and 23 to operate and supply electric power to the image sensor elements 11 and 13, and controls the transistor Tr 22 to stop so as not to supply electric power to the image sensor element 12. And, for example, in a case where an operating condition is changed to display a through-the-lens image by the user's operation, the CPU 3 controls the transistor Tr 22 to supply electric power also to the image sensor element 12. Each image data outputted from the image sensor elements 11, 12, and 13 is outputted to the data transfer controller 4.

Next, FIG. 3 will be explained. In FIG. 3, the data transfer controller 4 transfers image data received from the image sensor 1 to the parallax calculator 6 or the display controller 7. More specifically, the data transfer controller 4 transfers image data received from the image sensor element 11 to a predetermined memory area Ach 51 of the memory 5, and the data transfer controller 4 transfers image data received from the image sensor element 13 to a predetermined memory area Bch 52 of the memory 5. In accordance with an instruction of the CPU 3, the data transfer controller 4 reads the image data stored in the memory area Ach 51 and the image data stored in the memory area Bch 52 at a predetermined timing and transfers to the parallax calculator 6.

And the data transfer controller 4 transfers image data received from the image sensor element 12 to the display controller 7. The image data transferred to the display controller 7 is converted to predetermined format data and stored in a predetermined memory area (YUV area 53) of the memory 5. In accordance with an instruction from the CPU 3, the display controller 7 reads the image data stored in the YUV area 53 at a predetermined time interval and outputs it to the display 8. The image data outputted to the display 8 is displayed as a through-the-lens image. Therefore, it is possible for a user of the imaging apparatus 10 to confirm an image of a photographic subject.

Figure 4A:
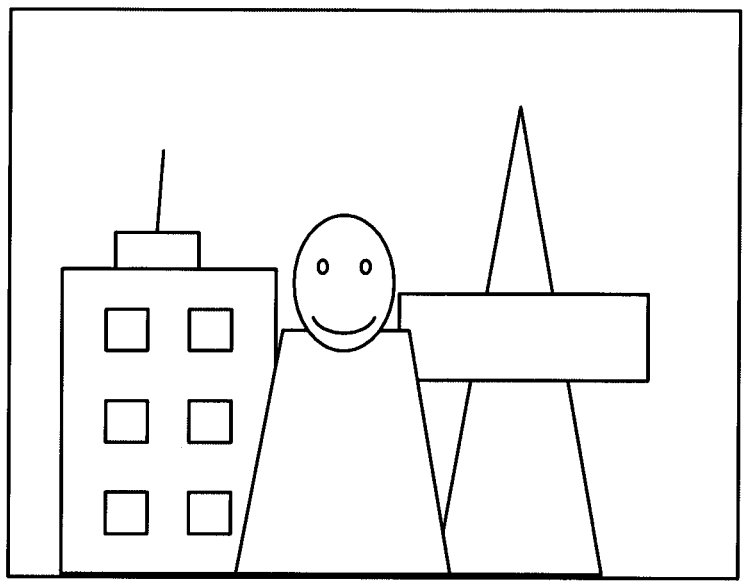
FIGS. 4A and 4B are examples of displays of through-the-lens images in the imaging apparatus according to the embodiment of the present invention.
Figure 4B:
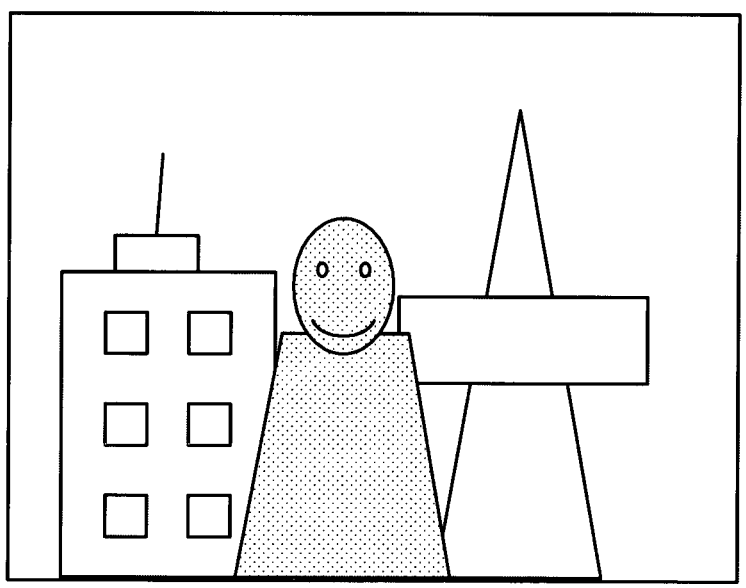

Next, examples of through-the-lens images in the imaging apparatus 10 will be explained by use of FIGS. 4A and 4B. FIG. 4A is an example of an image displayed as a through-the-lens image. FIG. 4B is an example of an image obtained for distance measurement. As illustrated in FIG. 4A, as for the image displayed as a through-the-lens image, an exposure adjustment is performed on an image of a person in the vicinity of the center of an angle of view to make visual recognition easier. However, in this case, a background is overexposed. On the other hand, as illustrated in FIG. 4B, as for the image for distance measurement, an image of a person in the vicinity of the center of an angle of view is underexposed, and overexposure in a background is suppressed. And therefore, it is possible to make a comparison of two images more precisely.

Thus, the image sensor 1 performs each different image processing in accordance with usage of image data outputted from the image sensor 1. Accordingly, the image sensor elements 11 and 13, which output image data used for parallax calculation for distance measurement of the image data outputted from the image sensor 1, set a γ coefficient and an average AE convergence range low and perform image processing. As for image data outputted from the image sensor elements 11 and 13 set as above, the center of the angle of view is underexposed, and overexposure in the background is suppressed. Therefore, it is possible to perform parallax calculation by use of image data based on pixel signals of the entire angle of view. On the other hand, the image sensor element 12, which outputs the image data for the through-the-lens image, sets a γ coefficient and an average AE convergence range higher than those of the image sensor elements 11 and 13; therefore, a tone range of an image of a main photographic subject in the center of the angle of view becomes large and a tone difference between the center and the background also becomes clear. Therefore, it is possible to obtain image data suitable for a through-the-lens image.

Next, a more detailed constitution of each image sensor element that constitutes the image sensor 1 will be explained by use of FIG. 5. FIG. 5 is a block diagram illustrating an example of a constitution of the image sensor element 11. Since the image sensor elements 11, 12, and 13 have the same constitution, here, the image sensor element 11 will be used for the explanation. In FIG. 5, the image sensor element 11 has an image signal output section 111, an ADC 112, an image data output section 113, and an operation controller 114.

The image signal output section 111 has sensor pixels of a photosensor that is a light-receiving surface, a horizontal scanning circuit, a vertical scanning circuit, and a CDS/Gain section, and is a circuit that outputs an image signal based on an image of a photographic subject formed on the light-receiving surface. The ADC 112 is a circuit that digitally converts the image signal outputted from the image signal output section 111 to image data and outputs it.

The image data output section 113 performs predetermined image processings on the image data digitally converted by the ADC 112, and outputs it to the data transfer controller 4 (see FIG. 1).

For example, in the predetermined image processings in the image data output section 113, as for image data used for parallax calculation, a γ coefficient and an average AE convergence range are set low, and as for image data used for a through-the-lens image, a γ coefficient and an average AE convergence range are set high. The setting of parameters used for the image processings performed by the image data output section 113 is instructed by the CPU 3 (see FIG. 1) via the operation controller 114.

The operation controller 114 controls the image data output section 113 to perform the predetermined image processings. And, for example, in the image sensor element 12 (see FIG. 2), until an output of a through-the-lens image is instructed, the operation controller 114 controls the image signal output section 111 to stop, or controls an operation state of the image signal output section 111 to slow operating clocks. The above control is performed by receiving an operating instruction from the CPU 3. In a case of slowing operating clocks by the operating instruction of the CPU 3, a PLL circuit that constitutes the operation controller 114 slows operating clocks of a CPU of the operation controller 114 and the image signal output section 111.

Figure 6:
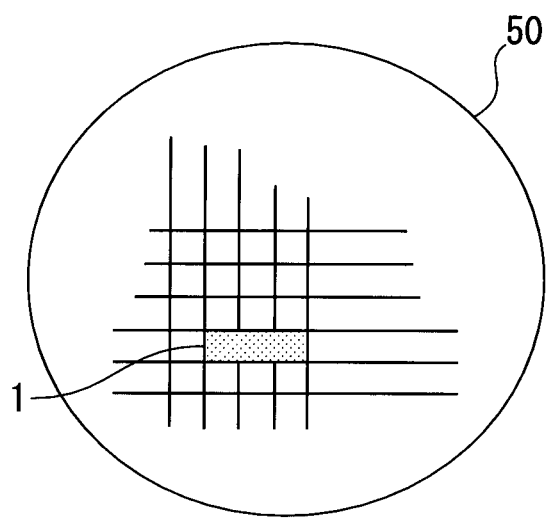
FIG. 6 is a diagram that illustrates a positional relationship of image sensor elements for distance measurement on a semiconductor wafer included in the imaging apparatus according to the embodiment of the present invention.

Next, a manufacturing method of the image sensor 1 will be explained by use of FIG. 6. The image sensor 1, as illustrated in FIG. 6, is an image sensor array that includes three image sensor elements aligned in line (for example, three image sensor elements expressed by dots in FIG. 6) of a plurality of image sensor elements formed on a semiconductor wafer 50 by a known semiconductor process, and the image sensor 1 is integrally cut out with the semiconductor wafer 50.

Since patterning using a mask is performed on the image sensor elements on the semiconductor wafer 50, therefore, as for the image sensor (image sensor array) 1, three image sensor elements 11, 12, and 13 (see FIG. 2) included in the image sensor 1 are aligned with high accuracy. And the pixel matrix of each image sensor element becomes parallel. Additionally, a surface on the semiconductor wafer 50 is a high-accuracy flat surface, therefore a normal line of the three image sensor elements becomes parallel. Accordingly, without corrections of a positional shift and an angle, it is possible to obtain the image sensor 1 in which the three image sensor elements are precisely arranged.

Figure 7:
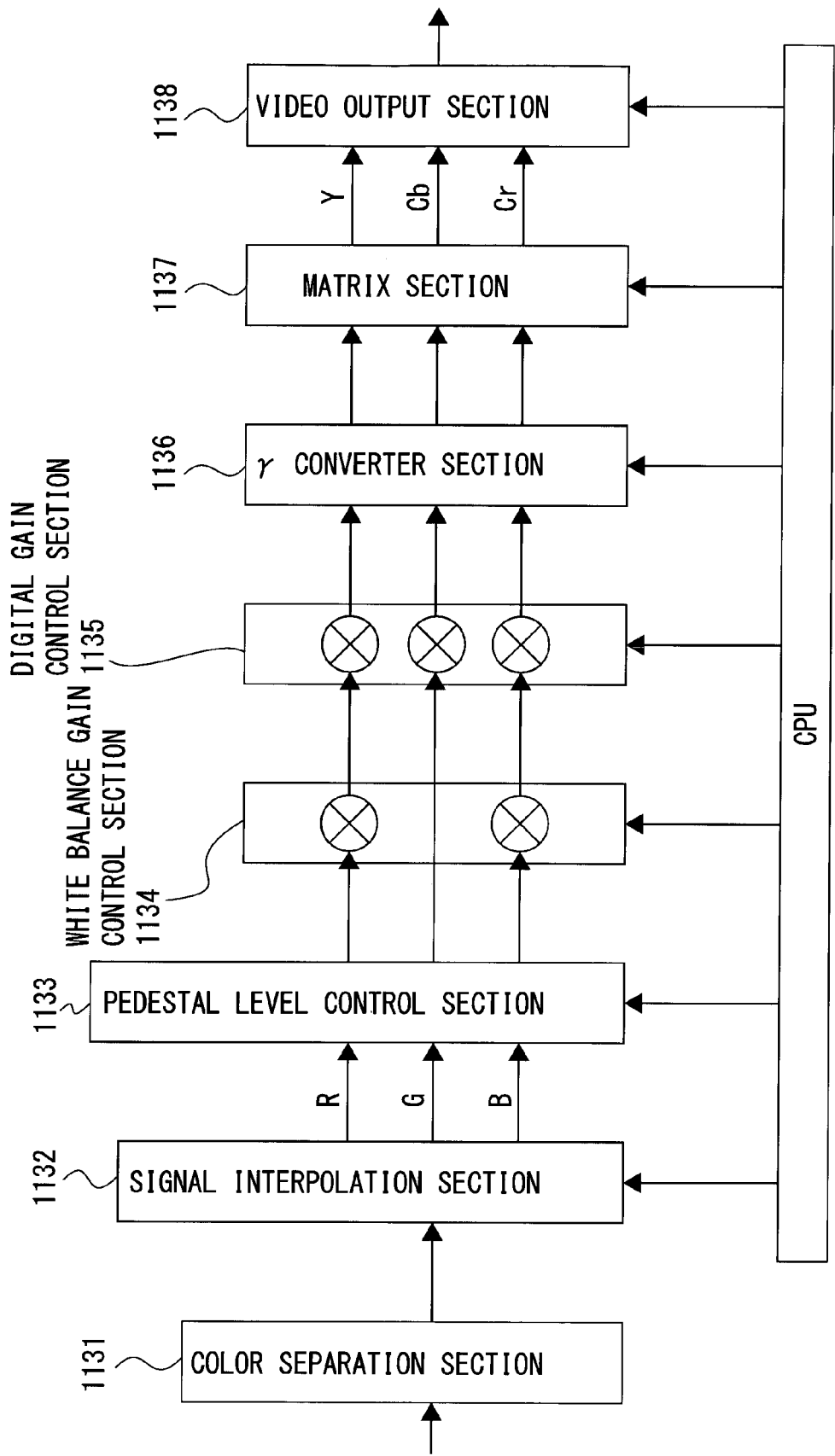
FIG. 7 is a block diagram of an image data output section of the image sensor element for distance measurement included in the imaging apparatus according to the embodiment of the present invention.

Next, an example of the image data output section 113 (see FIG. 5) included in the image sensor element 11 will be explained by use of FIG. 7. In FIG. 7, the image data output section 113 has a color separation section 1131, a signal interpolation section 1132, a pedestal level control section 1133, a white balance gain control section 1134, a digital gain control section 1135, a γ converter section 1136, a matrix section 1137, and a video output section 1138.

The color separation section 1131 performs an operation that separates the digital image data received from the ADC 112 (see FIG. 5) into R (red) image data, G (green) image data, and B (blue) image data. The signal interpolation section 1132 performs an operation that interpolates the R image data, G image data, and B image data separated in the color separation section 1131. The pedestal level control section 1133 performs an operation that controls a black level of the R image data, G image data, and B image data on which the interpolation operation has been performed in the signal interpolation section 1132. The white balance gain control section 1134 performs an operation that controls a white level of the R image data, and B image data. The digital gain control section 1135 performs an operation that controls a gain of each of the R image data, G image data, and B image data based on the gain set by an instruction of the CPU 3. The γ converter section 1136 performs a γ conversion operation of the R image data, G image data, and B image data. The matrix section 1137 performs an operation that separates the γ-converted R image data, G image data, and B image data into color difference signals (Cb and Cr) and a brightness signal (Y). The video output section 1138 sequentially outputs the color difference signals (Cb and Cr) and the brightness signal (Y) separated in the matrix section 1137 to the memory 5 via the data transfer controller 4.

Image data corresponding to the usage is outputted from the image data output section 113 by an operation control to the image output section 113 including the above constitution. The operation control to the image data output section 113 is performed by the CPU 3 (see FIG. 1) in accordance with an operating condition of the imaging apparatus 10 via the operation controller 114.

Here, an example of the operation control to the image data output section 113 will be explained. As explained above, the instruction of the operation control from the CPU 3 is performed by operating the operating section (not illustrated) and the like, and setting an operation mode. By the instruction of the operation control, parameters regarding image processings performed by the image data output section 113 are set. For example, a γ coefficient is changed based on the setting. The γ coefficient is a parameter used for the γ conversion operation performed by the γ converter section 1136.

An example of an image processing using different γ coefficients will be explained by use of FIGS. 8A and 8B. In each graph of FIGS. 8A and 8B, a horizontal axis expresses a value of input data, and a vertical axis expresses a value of output data. The input data is image data that is inputted to the γ converter section 1136. The output data is γ-converted image data in the γ converter section 1136. For example, in a case of outputting image data used for a through-the-lens image, the setting is changed to use a γ coefficient so as to establish a relationship between the input data and the output data as illustrated in FIG. 8A.

Figure 8A:
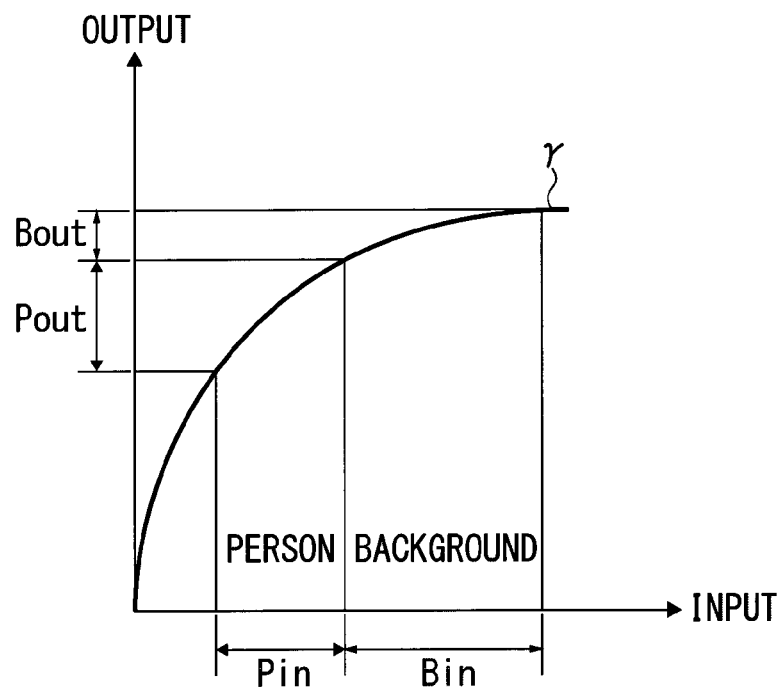
FIGS. 8A and 8B are explanatory diagrams of examples of image processings in the imaging apparatus according to the embodiment of the present invention.

As for a γ coefficient illustrated in FIG. 8A, as a value of the input data increases, a value of the output data is suppressed low. In a case of performing the γ conversion operation by use of this γ coefficient, an output range (Pout in FIG. 8A) corresponding to a range of input data having small values (for example, a range corresponding to a person, which is illustrated by Pin in FIG. 8A) becomes enlarged, and a signal level becomes large. Therefore, an image of this part (person) becomes clear, and becomes easy to see. Accordingly, the image data becomes suitable for a through-the-lens image.

However, an output range (Bout in FIG. 8A) corresponding to a range of input data having large values (for example, a range corresponding to a background, which is illustrated by Bin in FIG. 8A) becomes extremely narrow. That is, values of the output data become small, compared to values of the input data. And since the relationship between the input data and the output data is not a linear relationship, a difference of an output level is not constant with respect to a difference of an input level. This characteristic causes an error in a distance measurement result in triangulation in which distance measurement is performed by performing parallax calculation by use of two image data. That is, the image processing using the γ coefficient as illustrated in FIG. 8A is suitable for the image data used for the through-the-lens image, but is not suitable for parallax calculation using two image data.

Figure 8B:
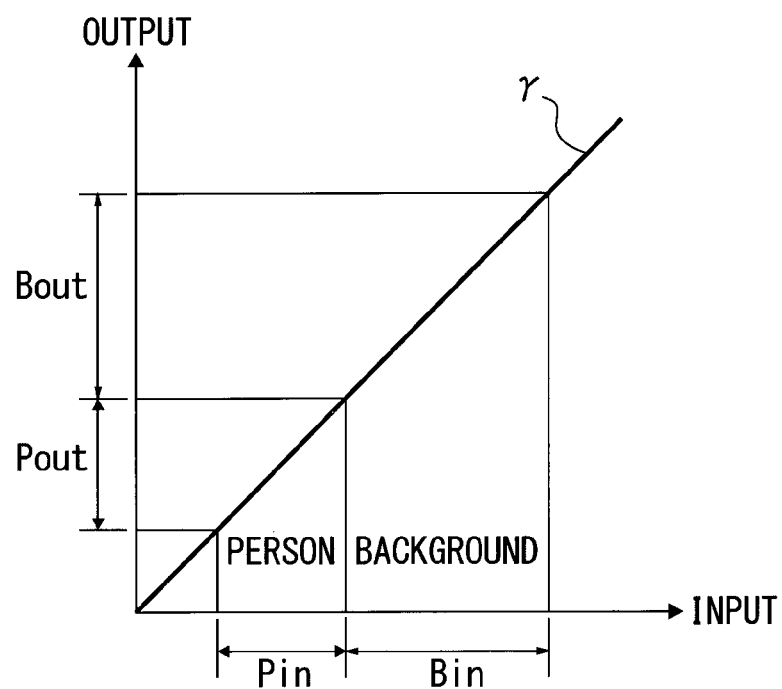

As for a γ coefficient illustrated in FIG. 8B, output data is outputted linearly with respect to input data. In a case of performing the γ conversion operation by use of this γ coefficient, tones of entire image data are maintained constantly, and the difference of the output level is constant with respect to the difference of the input level. Therefore, an image processing using the γ coefficient as illustrated in FIG. 8B is suitable for triangulation in which distance measurement is performed by performing parallax calculation by use of two image data.

In addition to the operating control that changes operating parameters of the image data output section 113 included in the image sensor 1 in accordance with operating conditions of the imaging apparatus 1 as explained above, for example, the CPU 3 detects an exposure amount from a brightness signal Y of image data outputted from the image sensor element 12, and the setting of shutter speed of an electronic shutter (not illustrated) can be performed such that the exposure amount is in a range of a predetermined value, via the data transfer controller 4.

Next, an example of a constitution of the image sensor 1 that is the image sensor for distance measurement will be explained by use of FIG. 9. As explained above, the image sensor 1 is an image sensor array that includes equal to or more than three image sensor elements aligned in line integrally cut out from a plurality of image sensor elements formed on the semiconductor wafer 50 (see FIG. 6). On the semiconductor wafer 50, on a sensor circuit 90 where the image signal output section 111 (see FIG. 5) formed by a semiconductor, the image data output section 113 (see FIG. 5) and so on are composed, a spacer 91 is mounted, and a protection glass 92 is mounted on the spacer 91. The sensor circuit 90 is connected to a pad 94 by a wiring layer 93. The pad 94 is connected to a solder ball 96 via a conductive hole 95. The solder ball 96 can be used for a reflow soldering process with respect to a circuit board (not illustrated). The image sensor 1 having the above constitution is formed on the semiconductor wafer 50.

Figure 10:
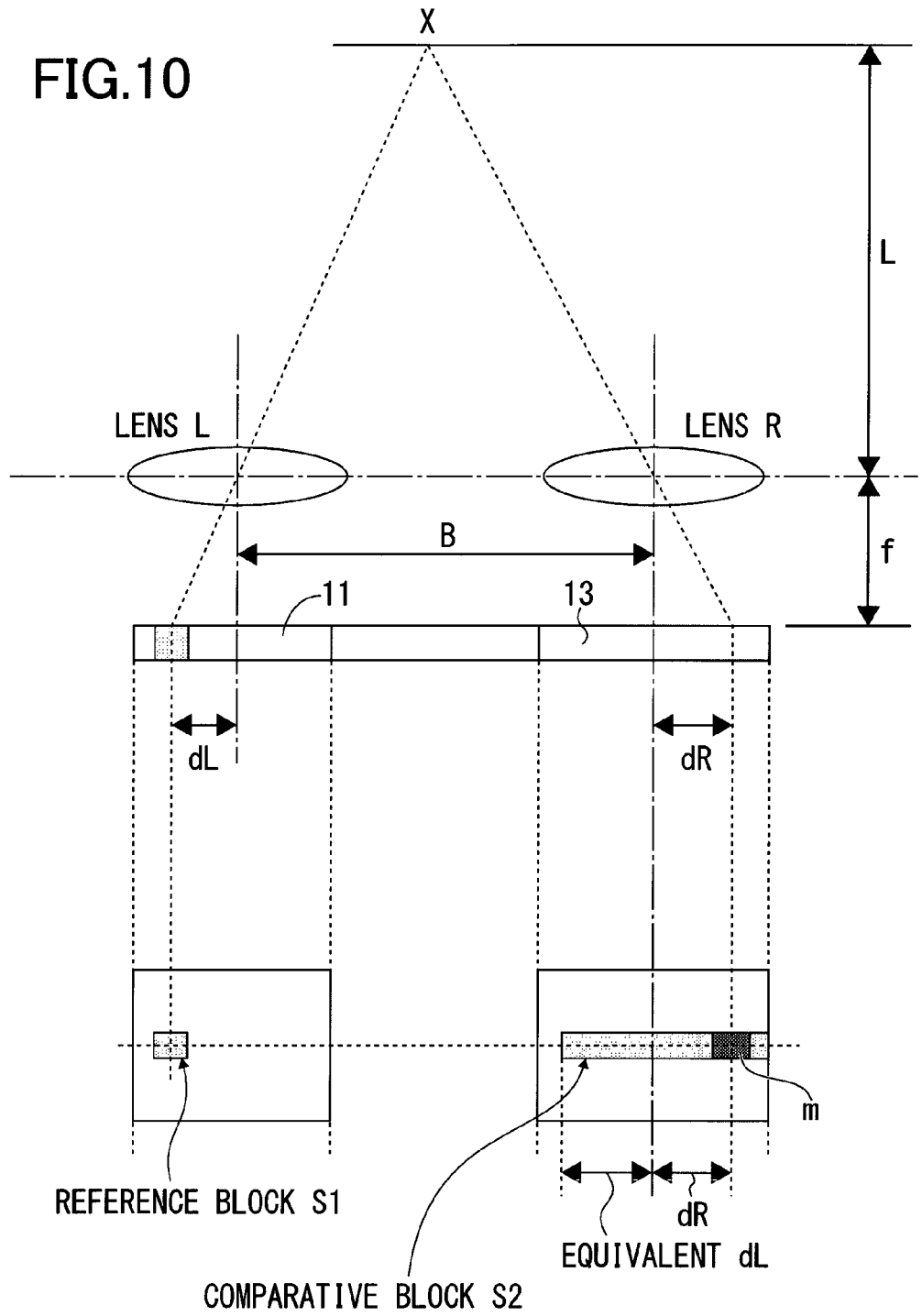
FIG. 10 is an explanatory diagram of a distance measurement method of a distance metering device included in the imaging apparatus according to the embodiment of the present invention.

Here, the triangulation method that is applied to a distance metering device included in the imaging apparatus according to the embodiment of the present invention will be explained. FIG. 10 is a diagram illustrating an example of the image sensor elements 11 and 13 that are two image sensor elements for distance measurement arranged at an interval of a length of a baseline, lenses L and R for distance measurement corresponding to each of the image sensor elements 11 and 13, and an image of a photographic subject X formed on each light-receiving surface of the image sensor elements 11 and 13.

In FIG. 10, in a case where a distance between the lens L and the lens R is taken as a length B of a baseline, a focal length of the lens L and the lens R is taken as a focal length f, a distance between a center of the image of the photographic subject formed on the image sensor element 11 by the lens L and a center of the lens L is taken as a distance dL, a distance between a center of the image of the photographic subject formed on the image sensor element 13 by the lens R and a center of the lens R is taken as a distance dR, and a distance L to the photographic subject is calculated by the following expression (Expression 1).

$$L=(B\times f)/(dL+dR)$$ Expression 1

Thus, the distance dL and the distance dR are measured, and therefore the distance L to the photographic subject is calculated.

In the following explanation, an image obtained by the lens L is called a reference image, and an image obtained by the lens R is called a comparative image. A specifying method of the distance dL and the distance dR will be explained. Firstly, an image of a photographic subject in the reference image of which the distance is desired to be measured is set as a reference block S1 of 8 pixels×8 pixels. Next, in the comparative image, a comparative block S2 is set. The comparative block S2a is a block that has the same vertical range as the reference block S1 and has a predetermined horizontal range in the right direction from the same horizontal position as the reference block S1. Next, from a left end of the comparative block S2, on a range of the same size (8 pixels×8 pixels) as the reference block S1, a matching calculation is performed. A value M of the matching calculation is calculated by the following expression (Expression 2).

$$M=\Sigma\Sigma(|A[x][y]-B[x][y]|)$$ Expression 2

In Expression 2, y=0 to 7, and x=0 to 7. And a pixel array in an image of 8 pixels×8 pixels of the reference block S1 is taken as a pixel array A, and a pixel array in an image of 8 pixels×8 pixels extracted from the comparative block S2 is taken as a pixel array B. In a position horizontally shifted by one pixel in the right direction in the comparative block S2, a matching calculation using Expression 2 is performed. As illustrated in Expression 2, the matching calculation is a total sum of a difference of each pixel, and in a case of a high correlation, a matching value M becomes small. The position is shifted by one pixel one by one and the matching calculation using Expression 2 is repeated, and eventually, a position where the matching value M becomes minimum is taken as a part m, which is illustrated in gray in FIG. 10.

Figure 11:
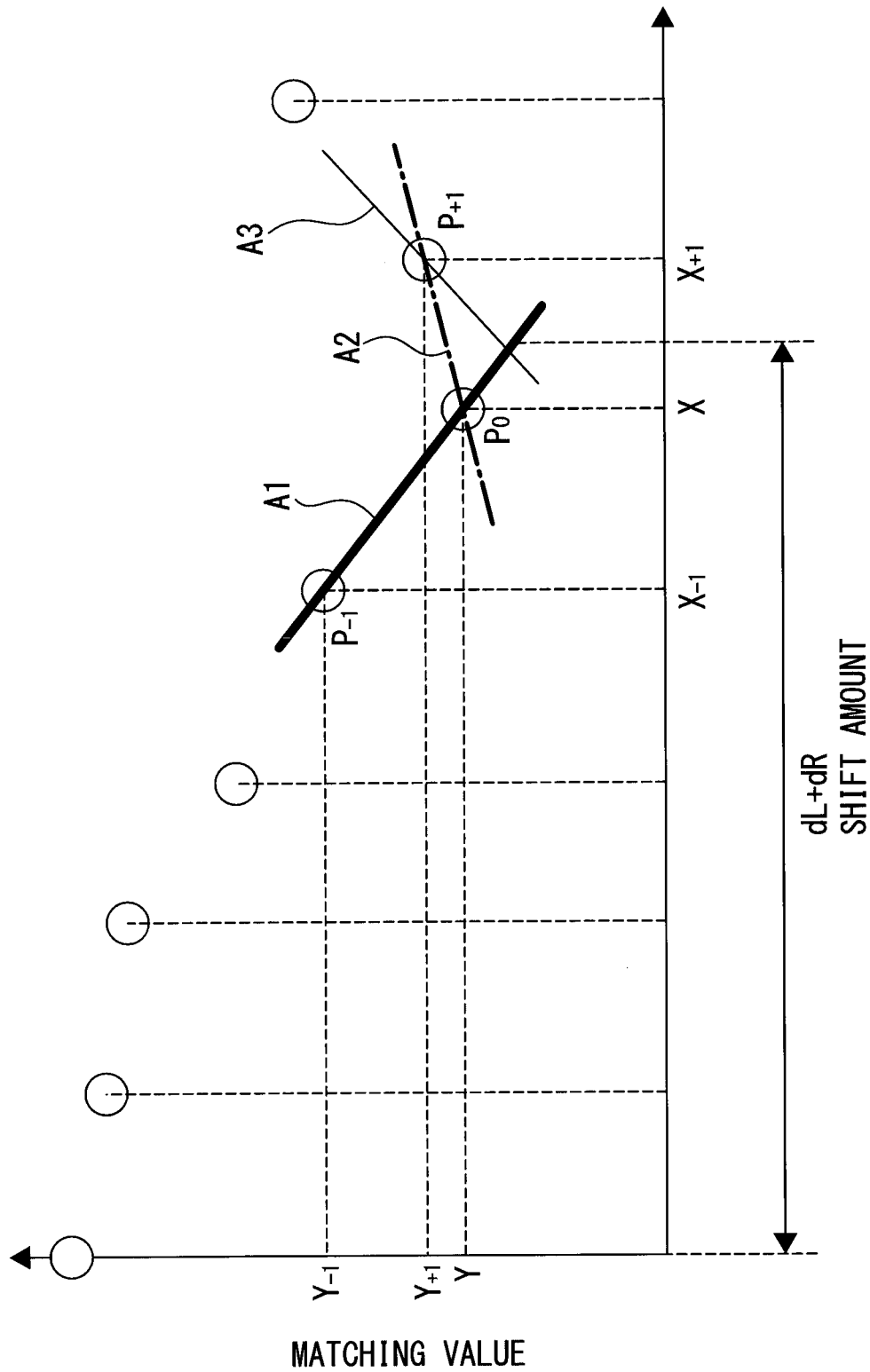
FIG. 11 is a graph that illustrates an example of a result of a matching calculation in the above distance measurement method.

In the matching calculation using Expression 2 as described above, an example of a relationship between a shift amount of the reference block S1 and the matching value M is illustrated in a graph of FIG. 11. In FIG. 11, a horizontal axis expresses the shift amount, and a vertical axis expresses the matching value M. The shift amount where the matching value becomes minimum equals the distance dL+the distance dR. This shift amount is calculated by interpolating points of the graph of FIG. 11. In an interpolation calculation method, a point $P_0$ (x, y) where the matching value M becomes minimum as an actual measurement value, a preceding point $P_{-1}$ $(x_{-1}, y_{-1})$, and a succeeding point $P_{+1}$ $(x_{+1}, y_{+1})$ are used.

In FIG. 11, an inclination of a straight line connecting the points $P_{-1}$ and $P_0$ is illustrated by a thick solid line A1, and an inclination of a straight line connecting the points $P_0$ and $P_{+1}$ is illustrated by a dashed-dotted line A2. The inclination of the thick solid line A1 and the inclination of the dashed-dotted line A2 are compared, and a straight line (solid line A3) where a value of a sharper inclination (an inclination is large) of the above multiplied by −1 is taken as an inclination is drawn in a position of the point $P_{+1}$. A position in the x direction of an intersection point of the solid line A1 and the solid line A3 is taken as an interpolated position where the matching value M becomes minimum. Here, a pixel interval is, for example, about 2 μm, and by the above interpolation operation, a position of the pixel interval having an accuracy of less than or equal to the pixel interval (less than or equal to 2 μm) is calculated. Therefore, it is necessary to maintain the accuracy of relative physical positions of a plurality of image sensor elements at 1 μm order. To achieve a high-accuracy physical position as above, in the distance metering device included in the imaging apparatus according to the embodiment of the present invention, a plurality of image sensor elements aligned in line (image sensor array) of a plurality of image sensor elements formed on the semiconductor wafer by the semiconductor process are integrally cut out from the semiconductor wafer, and are used.

Next, an imaging apparatus according to another embodiment of the present invention will be explained. In the embodiment described above, as the image sensor elements for distance measurement, an example of three image sensor elements aligned in line of the plurality of image sensor elements formed on the semiconductor wafer integrally cut out from the semiconductor wafer has been explained. However, an imaging apparatus is not limited thereto, and four image sensor elements aligned in line cut out from the semiconductor wafer can be used.

FIG. 12 is a schematic diagram illustrating an example of the present embodiment. In FIG. 12, an image sensor (image sensor array) 1a has four image sensor elements 11a, 12a, 13a, and 14a that are integrally cut out from a semiconductor wafer, and distance metering lenses 61, 62, 63, and 64 that form an image of a photographic subject each corresponding to each of the image sensor elements 11a, 12a, 13a, and 14a. Transistors Tr 21a, 22a, 23a, and 24a that constitute an electric power controller 2a control supply of electric power to the image sensor 1a.

In FIG. 12, for example, the distance metering lenses 61 and 64 facing the image sensor elements 11a and 14a arranged in both ends of the image sensor 1a constitute a telephoto optical system. On the other hand, the distance metering lenses 62 and 63 facing the image sensor elements 12a and 13a arranged in the center of the image sensor 1a constitute a wide-angle optical system.

In a case where a lens of a main optical system (not illustrated) included in the imaging apparatus is wide-angle, by control of the CPU 3, the transistors Tr 22a and 23a are operated, and electric power is supplied to the image sensor elements 12a and 13a. Thus, the image sensor elements 12a and 13a are operated, and therefore an image signal is outputted from an image of a photographic subject formed on each of those light-receiving surfaces. By performing distance measurement by use of the image signal, it is possible to perform the distance measurement suitable for the main optical system.

And in a case where a lens of the main optical system (not illustrated) included in the imaging apparatus is telephoto, by control of the CPU 3, the transistors Tr 21a and 24a are operated, and electric power is supplied to the image sensor elements 11a and 14a. Thus, the image sensor elements 11a and 14a are operated, and therefore an image signal is outputted from an image of a photographic subject formed on each of those light-receiving surfaces. By performing distance measurement by use of the image signal, it is possible to perform the distance measurement suitable for the main optical system.

By use of outputted image signals, parallax calculation is performed using the method described above, and therefore it is possible to perform distance measurement in accordance with an operating state of the main optical system. That is, it is possible for the transistors Tr 21a, 22a, 23a, and 24a, which constitute an electric power supply controller for supplying electric power to the image sensor elements, to selectively perform electric power supply to the image sensor elements as the image sensor elements for distance measurement in accordance with one of the operating conditions of the imaging apparatus, that is, if the lens is wide-angle or telephoto. Thus, in the imaging apparatus, it is possible to appropriately change electric power supply to the image sensor elements for distance measurement in accordance with the operating condition, and reduce wasted electric power consumption.

In a case where the four image sensor elements aligned in line are used, the length B of the baseline becomes long by using the image sensor elements 11a and 14a in both ends; therefore, it is possible to increase an amount of change of each of the distance dL and the distance dR with respect to the distance L to the photographic subject. Accordingly, it is possible to enhance the accuracy of distance measurement.

Figure 13A:
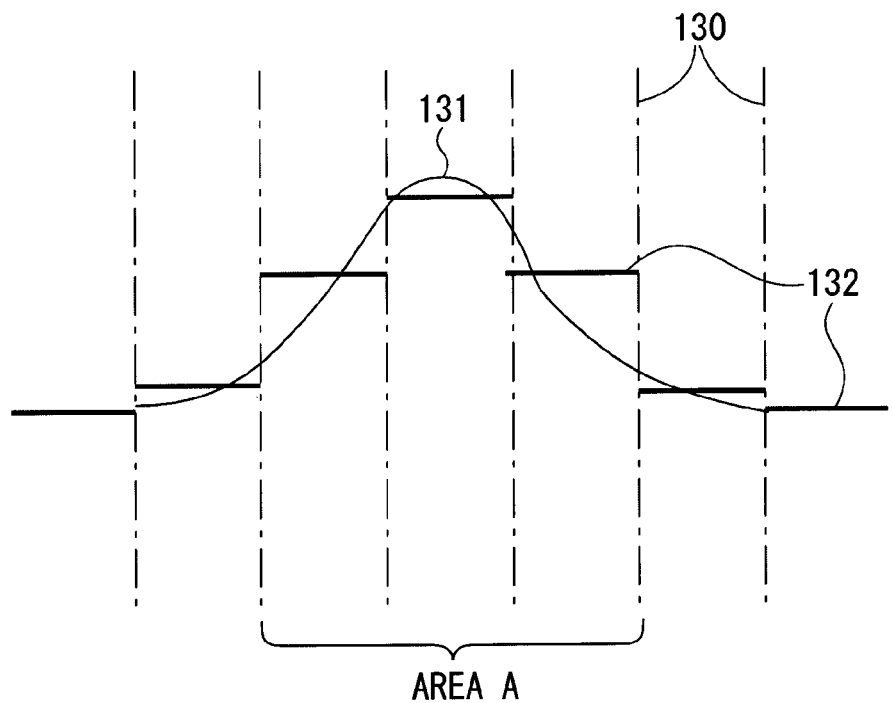
FIGS. 13A and 13B are explanatory diagrams of examples of image processings performed by the imaging apparatus according to the embodiment of the present invention.
Figure 13B:
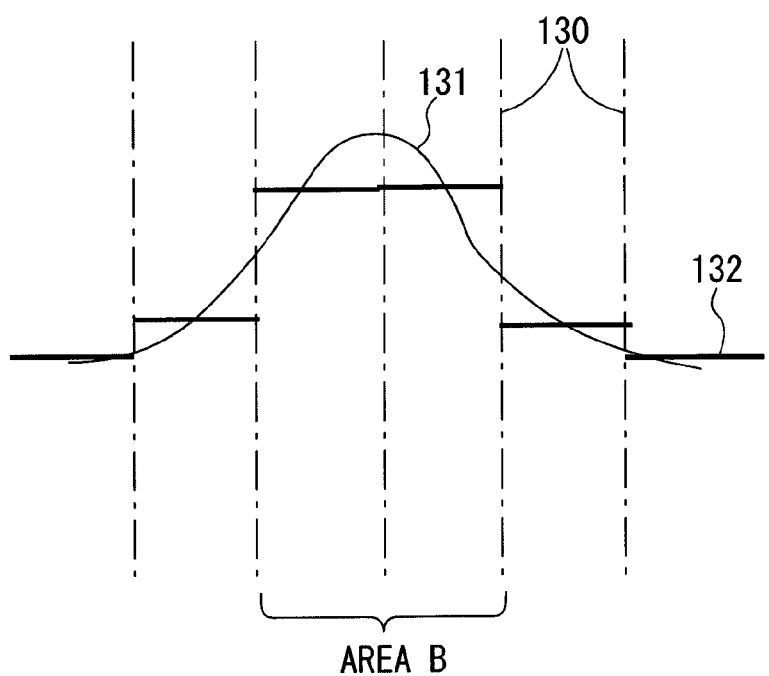

Next, a sampling error in the reference image and the comparative image will be explained. FIGS. 13A and 13B are diagrams illustrating examples of the sampling error. In each of FIGS. 13A and 13B, dashed-dotted lines 130 aligned at equal intervals express boundaries of pixels. A curved line illustrates an example of a contour 131 of a photographic subject. Horizontal lines 132 express examples of a value in each pixel. FIG. 13A is taken as the reference image, and FIG. 13B is taken as the comparative image.

As illustrated in FIGS. 13A and 13B, when the contour 131 of the photographic subject is refined and close to the size of pixels, as for positions of pixels of the image sensor elements 11 and 13, shifts occur due to parallax. For example, as illustrated in FIG. 13A, although a difference in a value of each pixel (see an area A of the lines 132 in FIG. 13A) occurs in the reference image, as illustrated in FIG. 13B, there may be a case where a part in which the value of each pixel becomes approximately the same (see an area B of the lines 132 in FIG. 13B) occurs in the comparative image. In such a case, since parallax calculation is performed by use of values that the lines 132 express, there is a high possibility that the position where the matching value M becomes minimum is shifted. That is, an error occurs in parallax calculation.

To suppress the above error, it is preferable to perform an edge enhancement operation on each image data. The edge enhancement operation is performed in the matrix section 1137 (see FIG. 7). For example, with respect to image data used for display of a through-the-lens image, so as to obtain a strong effect of the edge enhancement operation, the CPU 3 sets a filtering operation using a digital filter as illustrated in FIG. 14 to the matrix section 1137 via the operation controller 114.

The digital filter illustrated in FIG. 14 is an example of a digital filter that functions as a high-pass filter. A high frequency component is suppressed by multiplying input data in the matrix section 1137 by a coefficient α of this digital filter. When a value of the coefficient α increases, an effect of the edge enhancement operation becomes strong, and when the value of the coefficient α decreases, the effect of the edge enhancement operation can be weak.

Therefore, for example, in the imaging apparatus 1 as illustrated in FIG. 1, it is preferable that the CPU 3 set the value of the coefficient α large, to obtain a strong effect of the edge enhancement operation, with respect to the image sensor element 12 in the center of the image sensor 1, and set the value of the coefficient α small, to obtain a weak effect of the edge enhancement operation, with respect to the image sensor elements 11 and 13 in both ends of the image sensor 1 that output image data used for distance measurement.

In the imaging apparatus according to the embodiments of the present invention, in accordance with operating conditions of the imaging apparatus, it is possible to selectively perform control of the electric power supply to the plurality of image sensor elements included in the distance metering device, and reduce wasted electric power consumption. And additionally, in the imaging apparatus according to the embodiments of the present invention, in accordance with operating conditions of the imaging apparatus, it is possible to individually set the operating parameters per image sensor element included in the distance metering device, and therefore it is possible to perform optimum distance measurement suitable for shooting conditions.

In the imaging apparatus according to the embodiments of the present invention, the distance metering device includes the lenses for distance measurement, the part 100 including the image sensor 1, the electric power controller 2 and so on, the parallax calculator 6, and the CPU 3.

According to the embodiments of the present invention, a plurality of image sensor elements included in an image sensor array that are formed at predetermined intervals on a general-purpose semiconductor wafer and cut out from the semiconductor wafer are capable of being used selectively, and at least one image sensor element for distance measurement of the plurality of image sensor elements is capable of being used in different usage from parallax calculation. And additionally, selectively using the plurality of image sensor elements makes it possible to reduce wasted electrical power consumption.

Although the present invention has been described in terms of exemplary embodiments, it is not limited hereto. It should be appreciated that variations may be made in the embodiments described by persons skilled in the art without departing from the scope of the present invention as defined by the following claims.

CROSS REFERENCE TO RELATED APPLICATION

The present application is based on and claims priority from Japanese patent application number 2010-216601, filed Sep. 28, 2010, the disclosure of which is hereby incorporated by reference herein in its entirety.

The invention claimed is:

1. An imaging apparatus comprising:
an imaging optical system that obtains an optical image of a photographic subject;
a plurality of image sensor elements that output image data based on the optical image of the photographic subject obtained by the imaging optical system;
an electric power supply controller that controls electric power supply to the plurality of image sensor elements; and
a distance metering device that includes the plurality of image sensor elements and the electric power supply controller, and measures a distance to the photographic subject based on an output of the image sensor elements, wherein
the plurality of image sensor elements are aligned in a line and formed on one semiconductor wafer;
the electric power supply controller performs the electric power supply to the plurality of image sensor elements in accordance with operating conditions set to the imaging apparatus; and
in a case where an on/off setting of a monitoring operation is set to off, the electric power supply controller performs the electric power supply to only an image sensor element that outputs image data used for distance measurement of the plurality of image sensor elements included in the distance metering device.

2. The imaging apparatus according to claim 1, wherein the electric power supply controller performs the electric power supply to an image sensor element where the electric power supply is needed for the plurality of image sensor elements.

3. The imaging apparatus according to claim 1, wherein the distance metering device includes:
an operation controller that changes operating parameters of the plurality of image sensor elements, and changes each operating parameter per each image sensor element in accordance with the operating conditions set to the imaging apparatus.

4. The imaging apparatus according to claim 1, comprising:
a display, wherein
the distance metering device includes:
an operation controller that changes operating parameters of the plurality of image sensor elements, and the on/off setting of the monitoring operation that displays an image of the photographic subject on the display when the imaging apparatus operates is included in the operating conditions set to the imaging apparatus.

5. The imaging apparatus according to claim 1, comprising:
a display, wherein
the distance metering device includes:
an operation controller that changes operating parameters of the plurality of image sensor elements, and the on/off setting of the monitoring operation that displays an image of the photographic subject on the display when the imaging apparatus operates is included in the operating conditions set to the imaging apparatus, and in a case where the on/off setting of the monitoring operation is set to on, the electric power supply controller performs the electric power supply to only an image sensor element that outputs image data used for display on the display of the plurality of image sensor elements included in the distance metering device.

6. The imaging apparatus according to claim 1, wherein a setting regarding a focal length of the imaging optical system is included in the operating conditions set to the imaging apparatus, and, in accordance with the setting regarding the focal length, the electric power supply controller performs the electric power supply to only an image sensor element that operates in accordance with the setting regarding the focal length of the plurality of image sensor elements.

7. An imaging apparatus comprising:
an imaging optical system that obtains an optical image of a photographic subject;
a plurality of image sensor elements that output image data based on the optical image of the photographic subject obtained by the imaging optical system;
an electric power supply controller that controls electric power supply to the plurality of image sensor elements; and
a distance metering device that includes the plurality of image sensor elements and the electric power supply controller, and measures a distance to the photographic subject based on an output of the image sensor elements, wherein
the plurality of image sensor elements are aligned in a line and formed on one semiconductor wafer;
the electric power supply controller performs the electric power supply to the plurality of image sensor elements in accordance with operating conditions set to the imaging apparatus; and
in a case where the on/off setting of the monitoring operation is set to on, the electric power supply controller performs the electric power supply to only an image sensor element that outputs image data used for display on the display of the plurality of image sensor elements included in the distance metering device.

8. The imaging apparatus according to claim 7, wherein the electric power supply controller performs the electric power supply to an image sensor element where the electric power supply is needed for the plurality of image sensor elements.

9. The imaging apparatus according to claim 7, wherein the distance metering device includes:
an operation controller that changes operating parameters of the plurality of image sensor elements, and changes each operating parameter per each image sensor element in accordance with the operating conditions set to the imaging apparatus.

10. The imaging apparatus according to claim 7, comprising:
a display, wherein
the distance metering device includes:
an operation controller that changes operating parameters of the plurality of image sensor elements, and the on/off setting of the monitoring operation that displays an image of the photographic subject on the display when the imaging apparatus operates is included in the operating conditions set to the imaging apparatus.

11. The imaging apparatus according to claim 7, wherein a setting regarding a focal length of the imaging optical system is included in the operating conditions set to the imaging apparatus, and, in accordance with the setting regarding the focal length, the electric power supply controller performs the electric power supply to only an image sensor element that operates in accordance with the setting regarding the focal length of the plurality of image sensor elements.

* * * * *